(12) United States Patent
Picard et al.

(10) Patent No.: US 12,333,702 B2
(45) Date of Patent: Jun. 17, 2025

(54) METHOD FOR AUTOMATIC QUALITY INSPECTION OF AN AERONAUTICAL PART

(71) Applicant: SAFRAN, Paris (FR)

(72) Inventors: Sylvaine Picard, Moissy Cramayel (FR); Nacim Belkhir, Moissy Cramayel (FR); Enrico Sartor, Moissy Cramayel (FR)

(73) Assignee: SAFRAN, Paris (FR)

( * ) Notice: Subject to any disclaimer, the term of this patent is extended or adjusted under 35 U.S.C. 154(b) by 378 days.

(21) Appl. No.: 18/006,985

(22) PCT Filed: Jun. 29, 2021

(86) PCT No.: PCT/FR2021/051190
§ 371 (c)(1),
(2) Date: Jan. 26, 2023

(87) PCT Pub. No.: WO2022/023633
PCT Pub. Date: Feb. 3, 2022

(65) Prior Publication Data
US 2023/0274409 A1 Aug. 31, 2023

(30) Foreign Application Priority Data
Jul. 27, 2020 (FR) ...................................... 2007866

(51) Int. Cl.
*G06T 7/00* (2017.01)
*G01N 35/00* (2006.01)

(52) U.S. Cl.
CPC ..... *G06T 7/0004* (2013.01); *G01N 35/00613* (2013.01); *G06T 2207/10072* (2013.01);
(Continued)

(58) Field of Classification Search
CPC ......... G06T 7/0004; G06T 2207/10072; G06T 2207/10116; G06T 2207/10132;
(Continued)

(56) References Cited

U.S. PATENT DOCUMENTS 11,373,096 B2 * 6/2022 Chidlovskii ............ G06F 18/24
2007/0005528 A1 * 1/2007 Mukherjee ........... G05B 23/024
706/15

(Continued)

OTHER PUBLICATIONS

International Search Report as issued in International Patent Application No. PCT/FR2021/051190, dated Oct. 19, 2021.
(Continued)

*Primary Examiner* — Bobbak Safaipour
(74) *Attorney, Agent, or Firm* — Pillsbury Winthrop Shaw Pittman LLP

(57) ABSTRACT

A method for automatic quality inspection of an aeronautical part, includes detecting faults on an image of the aeronautical part using a trained artificial neural network; training an auto-encoder on a database, by projecting each image of the database onto a small mathematical space in which the images follow a predefined probability law; for each image of the database, calculating a plurality of metrics; supervised training of a classifier from the calculated metrics; detecting faults or anomalies in the image of the aeronautical part using the auto-encoder and the classifier.

11 Claims, 2 Drawing Sheets

(52) U.S. Cl.
CPC ............... *G06T 2207/10116* (2013.01); *G06T 2207/10132* (2013.01); *G06T 2207/20076* (2013.01); *G06T 2207/20081* (2013.01); *G06T 2207/20084* (2013.01); *G06T 2207/30164* (2013.01)

(58) Field of Classification Search
CPC . G06T 2207/20076; G06T 2207/20081; G06T 2207/20084; G06T 2207/30164; G01N 35/00613; G06N 3/045; G06N 3/088; G05B 2219/32179; G05B 2219/32193; G05B 19/41875; Y02P 90/02
See application file for complete search history.

(56) References Cited

U.S. PATENT DOCUMENTS

| | | | | |
|---|---|---|---|---|
| 2017/0004397 | A1* | 1/2017 | Yumer | G06N 3/045 |
| 2020/0210808 | A1* | 7/2020 | Dong | G06N 3/084 |
| 2021/0103580 | A1* | 4/2021 | Schierz | G06F 16/2365 |
| 2021/0334656 | A1* | 10/2021 | Sjögren | G06N 3/08 |
| 2023/0173946 | A1* | 6/2023 | Foland | B60L 58/12 |
| | | | | 701/31.9 |
| 2023/0281959 | A1* | 9/2023 | Hoshen | G06N 3/045 |
| | | | | 382/225 |
| 2025/0095126 | A1* | 3/2025 | Pieper | G06V 20/56 |

OTHER PUBLICATIONS

Beltran-Gonzalez, C., et al., "External and internal quality inspection of aerospace components," 2020 7th IEEE International Workshop on Metrology for Aerospace, Jun. 2020, XP033802043, pp. 351-355.

Venkataramanan, S., et al., "Attention Guided Anomaly Localization in Images," arxiv.org, Cornell University Library, Nov. 2019, XP081626372, 19 pages.

Chang, C.-W., et al., "A Review of Artificial Intelligence Algorithms Used for Smart Machine Tools," Inventions, vol. 3, No. 3, Jun. 2018, XP055788807, 28 pages.

San Biagio, M., et al., "Automatic inspection of aeronautic components," Machine Vision and Applications, vol. 28, No. 5, May 2017, XP036288274, pp. 591-605.

Sun, J., et al., "Surface Defects Detection Based on Adaptive Multiscale Image Collection and Convolutional Neural Networks," IEEE Transactions on Instrumentation and Measurement vol. 68. No. 12, Dec. 2019, XP011753952, pp. 4787-4797.

Mahalanobis, P. C., et al., "On the Generalized Distance in Statistics," Proceedings of the National Institute of Sciences of India, Apr. 1936, XP055788717, Retrieved from the Internet: URL:https://insa.nic.in/writereaddata/UploadedFiles/PINSA/Vol02 1936 1 Art05.pdf, [Retrieved on Mar. 23, 2021], pp. 49-55.

Boser, B. E., et al., "A Training Algorithm for Optimal Margin Classifiers," Aug. 1996, 10 pages.

Breiman, L., et al., "Random Forests," Machine Learning, vol. 45, Sep. 1999 (Published Oct. 2001), 35 pages.

Kingma, D. P., et al., "Auto-Encoding Variational Bayes," arxiv.org, Cornell University Library, May 2014, 14 pages.

Makhzania., et al., "Adversarial Autoencoders," arxiv.org, Cornell University Library, May 2016, 16 pages.

Rumelhart, D. E., et al., "Learning Internal Representations by Error Propagation," ICS Report 8506, Institute for Cognitive Science—University of California, San Diego, Sep. 1985, 49 pages.

He, K,. et al., "Deep Residual Learning for Image Recognition," Tech Report, arxiv.org, Cornell University Library, Retrieved from the Internet: URL: https://arxiv.org/abs/1512.03385v1, Dec. 2015, 1 page.

Ronneberger, O., et al., "U-Net: Convolutional Networks for Biomedical Image Segmentation," arxiv.org, Cornell University Library, Retrieved from the Internet: URL: https://arxiv.org/abs/1505.04597, May 2015, 1 page.

Badrinarayanan, V., et al., SegNet: A Deep Convolutional Encoder-Decoder Architecture for Image Segmentation, arxiv.org, Cornell University Library, Retrieved from the Internet: URL: https://arxiv.org/abs/1511.00561, Nov. 2015, 1 page.

\* cited by examiner

METHOD FOR AUTOMATIC QUALITY INSPECTION OF AN AERONAUTICAL PART

CROSS-REFERENCE TO RELATED APPLICATIONS

This application is the U.S. National Stage of PCT/FR2021/051190, filed Jun. 29, 2021, which in turn claims priority to French patent application number 2007866, filed Jul. 27, 2020. The content of these applications are incorporated herein by reference in their entireties.

TECHNICAL FIELD OF THE INVENTION

The technical field of the invention is that of aeronautical parts and in particular that of quality inspection of aeronautical parts also known as quality control of aeronautical parts.

The present invention relates to a method for automatic quality inspection of an aeronautical part.

TECHNOLOGICAL BACKGROUND OF THE INVENTION

To detect faults in an aeronautical part, it is known to use an artificial neural network that has been trained on a training database comprising images of aeronautical parts with faults and images of aeronautical parts without faults. Training is performed in a supervised manner, i.e. for each image in the training database, the artificial neural network knows whether the image has faults or not.

As it is not possible to know all the faults likely to affect aeronautical parts, the training database is not exhaustive. The neural network to which an image of an aeronautical part is subjected with a fault that was not present in the training database can then declare the aeronautical part compliant although it has a fault.

Similarly, the neural network to which an aberrant image is subjected, i.e. an image having characteristics different from those used during the learning phase of the neural network, of an aeronautical part, for example, and not exhaustively, an image of poor quality or an image that has a different illumination than the images in the database, may declare the aeronautical part non-compliant although it has no fault or conversely declare it as without fault when it has one.

Therefore, there is a need to be able to detect all the faults of an aeronautical part, whether these faults are known a priori or not, and not to declare an aeronautical part that does not have any faults as non-compliant.

There is also a need to be able to detect that an image subjected to the artificial neural network has different characteristics than those used during its training, which leads to a risk of malfunctioning of the neural network.

SUMMARY OF THE INVENTION

The invention makes it possible to remedy the aforementioned disadvantages.

The invention relates to a method for automatic quality inspection of an aeronautical part comprising the following steps:
   training an artificial neural network on a first training database;
   acquiring at least one image of the aeronautical part;
   detecting faults on the image of the aeronautical part using the trained artificial neural network;
   unsupervised training of an auto-encoder on a second training database comprising a plurality of images of fault-free aeronautical training parts, comprising the following sub-steps:
      projecting each image in the second training database onto a mathematical space of reduced dimension relative to the dimension of each image in the second training database, so that all projections of the images in the second database in the mathematical space follow a predefined probability law;
      reconstructing each image of the second training database from the projection of the image of the second training database onto the mathematical space to obtain a reconstructed image;
   for each image of the second training database, calculating a plurality of metrics from the projection of the image of the second training database onto the mathematical space or from the corresponding reconstructed image, to obtain a metric value for each metric;
   supervised training of a classifier based on the metric values obtained;
   detecting faults or anomalies in the image of the aeronautical part using the trained auto-encoder and classifier;
   if the artificial neural network detects at least one fault in the image of the aeronautical part or if the artificial neural network detects no fault in the image of the aeronautical part and the classifier detects at least one fault or an anomaly in the image of the aeronautical part, the aeronautical part is considered non-compliant; otherwise, the aeronautical part is considered compliant.

Through the invention, the artificial neural network used for detecting faults in an aeronautical part is provided with a monitoring module comprising the auto-encoder and the classifier, making it possible to determine whether or not the artificial neural network has correctly carried out the detection task. To do this, the monitoring module performs detection itself, not based on image characteristics such as the neural network, but on the calculation of metrics depending on projection by the auto-encoder of the image to be tested onto the mathematical space, after training on images without faults, allowing it to be more robust to aberrant images and to images with unknown faults. In fact, with training based on images that have faults, the classifier risks learning specifically the types of faults present and not working properly in the case of images showing unlearned faults or completely aberrant images.

Thus, if the detection performance of the neural network deteriorates because the image to be tested has a fault that is not known in the neural network or the image to be tested is aberrant, this is not the case for the monitoring module which can report an anomaly when the results of its detection differ from those of the detection of the neural network.

Preferably, as the calculation of the metrics depends in part on the projection by the auto-encoder of the image to be tested onto the mathematical space, an adversarial auto-encoder or a variational auto-encoder is chosen as auto-encoder, these auto-encoders allowing better control of the distribution of projections of images onto the mathematical space, called latent space.

In addition to the characteristics just mentioned in the preceding paragraph, the method according to the invention may have one or more of the following complementary characteristics, considered individually or in all technically possible combinations.

According to one aspect of the invention, the image of the aeronautical part, the plurality of images of the first training database and the plurality of images of the second training database are visible, X-ray, ultrasound or tomography images.

According to one aspect of the invention, the method further comprises for each metric, a step of distributing the metric values of the images of the second training database into a first group of values and into a second group of values according to a predefined validity criterion, the classifier being trained to consider the images of the second training database having the metric values of the first group of values as being free from faults or anomalies and the images of the second training database having the metric values of the second group of values as images to be rejected.

Thus, supervised training of the classifier is possible without using images with faults or anomalies to avoid risking affecting the generalisation power of the classifier.

According to one aspect of the invention, the step of detecting a fault on the image of the aeronautical part using the trained auto-encoder and classifier comprises the following sub-steps:

projecting, by the auto-encoder, the image of the aeronautical part onto the mathematical space;
reconstructing, by the auto-encoder, the image of the aeronautical part from the projection of the image of the aeronautical part onto the mathematical space to obtain a reconstructed image of the aeronautical part;
calculating metrics from the projection of the image of the aeronautical part onto the mathematical space or from the reconstructed image of the aeronautical part to obtain metric values;
detecting faults on the image of the aeronautical part by the classifier from the metric values obtained for the image of the aeronautical part.

According to one aspect of the invention, the plurality of metrics includes, for a given image, a distance between the projection of the image onto the mathematical space and all projections of the plurality of images of the second database onto the mathematical space, and/or a distance between the image and the reconstructed image, and/or an entropy of the gaps between the image and the reconstructed image.

Thus, an image of which the projection onto the mathematical space is far from the probability law or an image that is too different from its reconstructed image will be considered as having a fault or an anomaly by the classifier.

According to an alternative embodiment of the aspect of the preceding invention, the law of probability is a multivariate Gaussian law and the distance between the projection of the image onto the mathematical space and all projections of the plurality of images of the second database in the mathematical space is the Mahalanobis distance.

According to an aspect of the invention, the method of the invention comprises a step of generating an alert if the artificial neural network detects no fault on the image of the aeronautical part and the classifier detects at least one fault or an anomaly on the image of the aeronautical part.

Thus, if the artificial neural network has not detected any fault but the monitoring module has detected a fault or an anomaly, an alert is generated to indicate that the neural network has failed in its detection task or was not able to perform it correctly.

According to an aspect of the invention, training of the artificial neural network can be of the supervised training type and the first training database comprises a plurality of training images of aeronautical parts with or without faults.

According to an aspect of the invention, training of the artificial neural network can also be unsupervised training and the first training database comprises a plurality of training images of aeronautical parts without faults.

The invention also relates to a computer program comprising program code instructions for performing steps of the method according to the invention when said program is executed on a computer.

The invention and its various applications will be better understood by reading the description that follows and examining the figures that accompany it.

BRIEF DESCRIPTION OF THE FIGURES

The figures are presented for illustrative purposes only and in no way limit the invention.

DETAILED DESCRIPTION

Unless otherwise specified, the same item appearing in different figures has a unique reference.

The invention relates to an automatic method for inspecting the quality of an aeronautical part.

The method is automatic, i.e. it is implemented by a calculator.

In the context of the invention, "quality inspection of a part" means determining whether or not the part is compliant, i.e. the part is considered as compliant if no fault has been detected on the part and non-compliant if at least one fault has been detected on the part.

An aberrant image or image with an anomaly is an image that has characteristics different from those used during learning of the artificial neural network or that has a fault.

Figure 1:
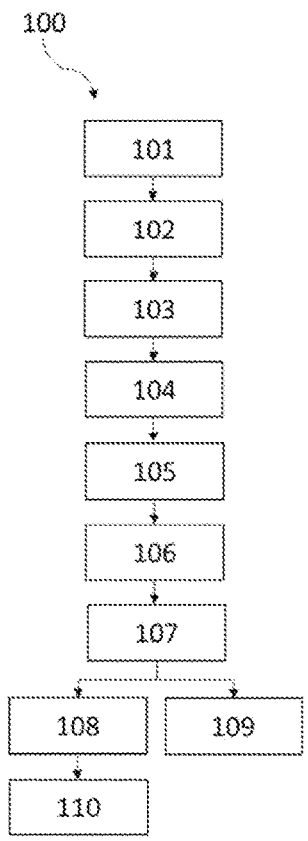
FIG. 1 is a block diagram illustrating the sequence of steps of the method of the invention.

FIG. 1 is a block diagram illustrating the sequence of the steps of method 100 of the invention.

Figure 2:
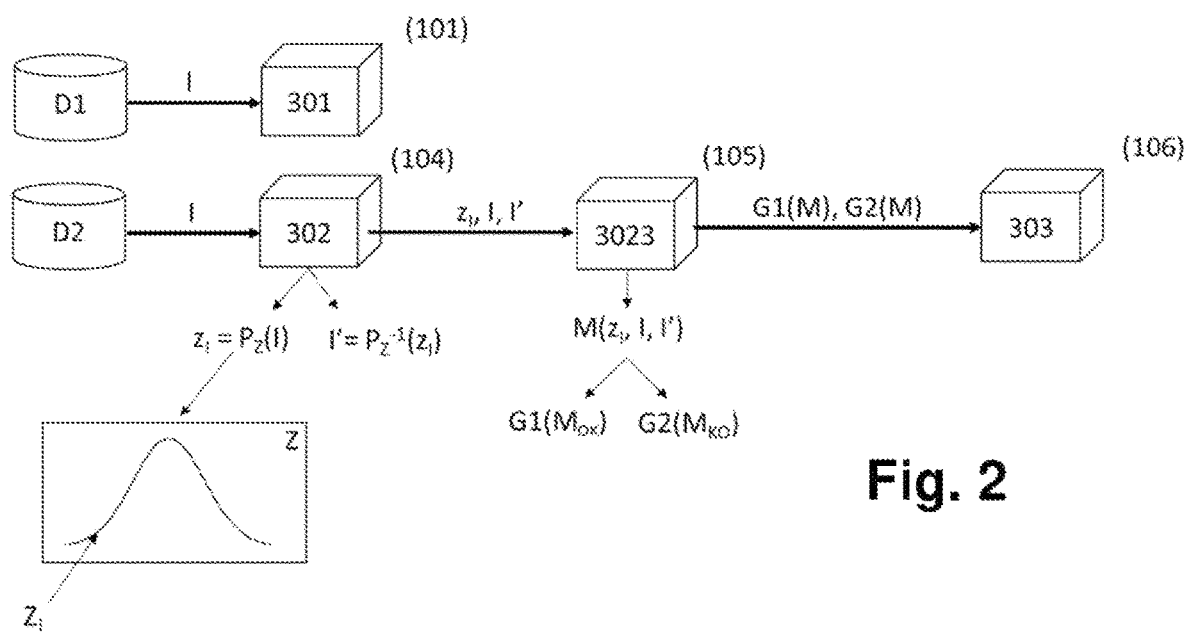
FIG. 2 is a schematic representation of the first, fourth, fifth and sixth steps of the method according to the invention.

FIG. 2 is a schematic representation of the first 101, fourth 104, fifth 105 and sixth 106 steps of the method 100 according to the invention.

Figures 3, 4:
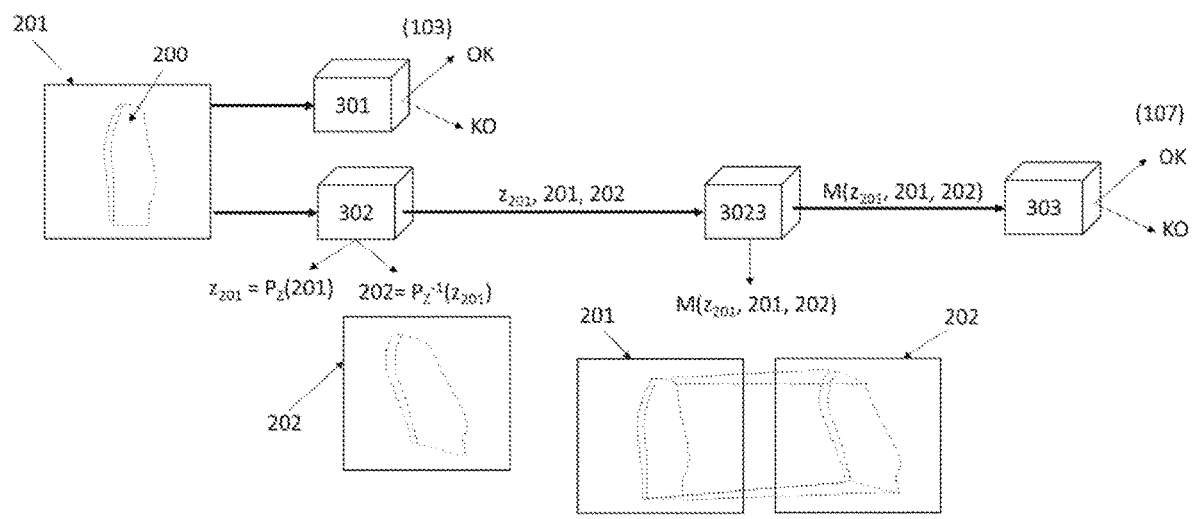
FIG. 3 is a schematic representation of the third and seventh steps of the method according to the invention.
FIG. 4 is a decision-making matrix giving the step(s) of the method of the invention carried out according to the result of the detection of the artificial neural network and the result of the detection of the classifier.

FIG. 3 is a schematic representation of the third 103 and seventh 107 steps of the method 100 according to the invention.

The first step 101 of the method 100 consists in training an artificial neural network 301 on a first training database D1.

The first training database D1 contains a plurality of images of training aeronautical parts I.

In the remainder of the application, the terms "neural network" and "artificial neural network" will be used interchangeably.

For example, an artificial neural network 301 may be of the MLP type for "Multi-Layer Perceptron", i.e. it comprises at least two layers each comprising at least one artificial neuron. A connection between two neurons is called a synapse. Each synapse is assigned a synaptic coefficient.

For example, each neuron in each layer is connected to each neuron in the previous layer and to each neuron in the next layer. For example, neurons in the same layer are not connected to each other.

The artificial neural network 301 may also be ResNet (https://arxiv.org/abs/1512.03385v1), UNet (https://arxiv.org/abs/1505.04597) or SegNet (https://arxiv.org/abs/1511.00561) or have any other architecture to perform a semantic segmentation, detection or classification task.

The first step 101 of training the artificial neural network 301, otherwise known as the learning step, consists of determining the synaptic coefficients of the neural network 301 from images I of the first training database D1.

According to a first embodiment, the training is supervised, i.e., each image I of the first database D1, called the input image, is associated with the same image in which faults are identified, called the true output image. Thus, the first training step 101 consists in browsing the first training database D1 and, for each input image I provided to the artificial neural network 301, updating synaptic coefficients using an optimization algorithm, to minimise the gap between the output image provided by the artificial neural network 301 and the true output image associated with the input image I.

To perform this supervised training, the artificial neural network 301 can be trained to assign the "fault" class or "non-fault" class to an image.

Alternatively, the artificial neural network 301 may be trained to estimate a bounding box around the faults present in the image.

According to a second embodiment, the training is unsupervised, i.e. only images I of the first database D1 are provided to the neural network 301.

In the second embodiment, the first training database D1 includes only images I with no faults.

A second step 102 of the method 100 consists of acquiring at least one image 201 of the aeronautical part 200 to be inspected.

Image 201 of the aeronautical part 200 to be inspected can be a visible image acquired by an industrial camera, an X-ray image acquired for example by X-ray, an ultrasound image acquired for example by ultrasound or a tomographic image acquired by a tomograph.

Images I of the first training database D1 are of the same type as image 201 of the aeronautical part 200 acquired in the second step 102. Thus, for example, if image 201 of the aeronautical part 200 is acquired by ultrasound, images I of the first training database D1 are also acquired by ultrasound.

The order of the first step 101 and the second step 102 could be reversed, i.e. the second step 102 could be performed before the first step 101.

The third step 103 of the method 100 consists, for the artificial neural network 301 trained in the first step 101, in detecting any faults present in image 201 of the aeronautical part 200 acquired in the second step 102.

As shown in FIG. 3, at the end of the third step 103, the neural network 301 can provide a label indicating whether it has detected a fault or not on image 201 of the aeronautical part 200, i.e. having a first label for the "fault" class and a second label for the "non-fault" class. In FIG. 3, the neural network 301 returns the label KO if it has detected a fault on image 201 of the aeronautical part 200 or the label OK if it has not detected any fault on image 201 of the aeronautical part 200.

The neural network 301 could also provide image 201 of the aeronautical part 200 in which it would have framed the detected faults and possibly assign a type of fault to each framed fault.

The fourth step 104 of the method 100 consists in training an auto-encoder 302 on a second training database D2.

"Auto-encoder" means an unsupervised learning algorithm based on an artificial neural network, enabling the construction of a new representation of a dataset, generally of a smaller dimension than the dimension of the dataset. To do this, the auto-encoder projects the dataset onto a mathematical space of a dimension that is smaller than the dimension of the dataset.

Typically, an auto-encoder has an encoder and a decoder. The encoder constructs the reduced dimension representation from an initial dataset and the decoder reconstructs the dataset from the reduced dimension representation.

The encoder of the auto-encoder performs a sequence of operations according to the artificial neural network architecture, and in particular the type of artificial neural layers making up the artificial neural network. A convolution layer is an example of a layer type. Based on a sound choice of parameters for each layer of the artificial neural network, the objective of the encoder is to transform and spatially reduce the size of the initial dataset, provided at the input of the artificial neural network, to obtain a vector, i.e. a set of variables, which will only retain the most relevant information from the initial dataset. The purpose of the encoder is therefore to transform the initial datasets from an "initial" space to a "mathematical" or "digital" space of smaller dimension, which makes it possible to describe the input datasets in the reduced form of a vector.

The fourth step 104 consists of updating the parameters of the auto-encoder 302, i.e. the synaptic coefficients of the neural network composing the auto-encoder 302, to minimise the error between the reconstructed dataset and the initial dataset.

Thus, the training of the auto-encoder 302 is an unsupervised training and the second training database D2 has a plurality of images of training aeronautical parts I with no faults.

In the context of the invention, a dataset is an image, or a set of images, 2D or 3D.

In FIG. 3, the encoder of the auto-encoder 302 projects by a projection operation $P_Z$, images I of the second training database D2 onto the mathematical space Z, each image I of the second training database D2 having a projection $z_I$ onto the mathematical space Z. The decoder of the auto-encoder 302 reconstructed by a reverse operation $P_Z^{-1}$ of the projection operation $P_Z$, each image I of the second training database D2 from the projection $z_I$ onto the mathematical space Z of image I to obtain a reconstructed image I'.

The fourth step 104 therefore consists in updating the parameters of the auto-encoder 302 to minimise the error between each image I of the second training database D2 and the corresponding reconstructed image I'.

The auto-encoder 302 is preferably a variational auto-encoder or adversarial auto-encoder, which allows better control of the distribution of projections $z_I$ in mathematical space Z (called latent space).

The auto-encoder 302 is trained so that the set $Z_I$ of the projections $z_I$ of the plurality of images I of the second database D2 in the mathematical space Z follows a predefined probability law.

The probability law is, for example, a uniform law or a multivariate Gaussian law.

In FIG. 3, the probability law is a normal law.

Images I of the second training database D2 are of the same type as image 201 of the aeronautical part 200 acquired in the second step 102 and images I of the first training database D1. Thus, for example, if image 201 of the aeronautical part 200 is acquired by ultrasound, images I of the second training database D2 are also acquired by ultrasound.

In the first embodiment in which the first step 101 of training the artificial neural network 301 on the first training database D1 is a supervised training, the second training database D2 can be the part of the first training database D1 that has images I that have no faults.

In the second embodiment in which the first step 101 of training the artificial neural network 301 on the first training database D1 is an unsupervised training, the first training database D1 and the second training database D2 can be a single training database. Images with faults are used to observe the behaviour of the auto-encoder and metrics at the time of the development of the solution.

The fifth step 105 of method 100 consists of calculating a plurality of metrics M from the projection $z_I$ of each image I of the second database D2 in the mathematical space Z or the corresponding reconstructed image I'.

For a given image I, the plurality of metrics M includes for example a distance between the projection $z_I$ of the given image I on the mathematical space Z and the set $Z_I$ of the projections $z_I$ of the plurality of images I of the second training database D2 in the mathematical space Z, and/or a distance, for example of the standard type L1, L2, L∞ or other, between the given image I and the corresponding reconstructed image I' and/or an entropy on the gaps between the given image I and the corresponding reconstructed image I'.

If set $Z_I$ of projections $z_I$ of images I of the second training database D2 follows a multivariate Gaussian law of average $\mu$ and covariance $Coy$ in mathematical space Z, the distance between projection $z_I$ of the given image I on mathematical space Z and set $Z_I$ of projections $z_I$ of the plurality of images I of the second training database D2 in mathematical space Z is for example the Mahalanobis Maha distance defined as:

$$\text{Maha}(z_I) = \sqrt{(z_I-\mu)^T \text{Cov}_Z^{-1}(z_I-\mu)}$$

The entropy H on the gaps between the given image I and the reconstructed image I' is defined, for example, as:

$$H(I - I') = -\sum_{i=1}^{n} P_i(I - I') \log_i P_i(I - I')$$

With $P_i$ (I-I'), the gap between image I and the corresponding reconstructed image I for pixel $P_i$.

In FIG. 2, the fifth step 105 is performed by module 3023.

At the end of the fifth step 105, for each image I of the second training database D2, a metric value M was obtained for each metric M.

The sixth step 106 of the method 100 consists in training a classifier 303 in a supervised way from the metric values M obtained in the fifth step 105.

For example, for each metric M, the metric values M obtained in step five 105 are separated into a first group of values G1 and a second group of values G2 according to a predefined validity criterion.

The classifier 303 is then trained to consider images I of the second training database D2 having the metric values M of the first group of values G1 as having no fault or anomaly and images I of the second training database D2 having the metric values M of the second group of values G2 as having a fault or anomaly.

The predefined validity criterion is, for example, to place the N worst metric values M for the given metric M in the second group of values G2 and to place the other M metric values in the first group of values G1. Thus, for example, in the case where the metric is the Mahalanobis distance, the validity criterion consists in placing the most important N metric values M in the second group of values G2 and the other metric values M in the first group of values G1.

The fourth 104, fifth 105 and sixth 106 steps could be performed before the first step 101 or simultaneously with the first step 101.

The seventh step 107 of the method 100 consists, for the auto-encoder 302 trained in the fourth step 104 and for the classifier 303 trained in the sixth step 106, in detecting any faults or anomalies in image 201 of the aeronautical part 200 acquired in the second step 102.

To do this, the encoder of the auto-encoder 302 projects image 201 of the aeronautical part 200 onto the mathematical space Z and the decoder of the auto-encoder 302 reconstructs image 201 of the aeronautical part 200 from projection 2201 of image 201 of the aeronautical part 200 onto the mathematical space Z to obtain a reconstructed image 202.

The plurality of metrics M is calculated by module 3023 from projection 2201 of image 201 of the aeronautical part 200 onto the mathematical space Z or from the reconstructed image 202 of the aeronautical part 200.

The classifier 303 then detects any faults or anomaly in image 201 of the aeronautical part 200 from the metrics M calculated for image 201 of the aeronautical part 200.

As shown in FIG. 3, at the end of the seventh step 107, classifier 303 can provide a label indicating whether it has detected a fault or an anomaly, or not, in image 201 of the aeronautical part 200. In FIG. 2, the classifier 303 returns the label KO if it has detected a fault or anomaly in image 201 of the aeronautical part 200 or the label OK if it has not detected any fault or anomaly in image 201 of the aeronautical part 200.

The seventh step 107 can be performed before or simultaneously at the third step 103.

FIG. 4 is a decision-making matrix giving the step(s) of the method 100 carried out according to the result of the detection of the artificial neural network 301 and the result of the detection of the classifier 303.

If the artificial neural network 301 detects at least one fault on image 201 of the aeronautical part 200, an eighth step 108 of the method 100 consisting of considering the aeronautical part 200 as non-compliant is performed.

If the artificial neural network 301 does not detect any fault on image 201 of the aeronautical part 200 and the classifier 303 detects at least one fault or anomaly in image 201 of the aeronautical part 200, the eighth step 108 is performed.

In this case, the eighth step 108 is followed by, for example, a tenth step 110, which consists of generating an alert. The alert indicates that the neural network 301 has failed to detect a fault.

For example, the alert may lead to automatic scrapping of the aeronautical part 200, to manual expertise, or to the storage of image 201 of the aeronautical part 200 in the first training database D1 for retraining the neural network 301.

If the artificial neural network 301 detects no fault on image 201 of the aeronautical part 200 and the classifier 303 detects no fault or anomaly on image 201 of the aeronautical part 200, a ninth step 109 of the method 100 consisting of considering the aeronautical part 201 as compliant is performed.

The invention claimed is:

1. A method for automatic quality inspection of an aeronautical part, comprising:
   training an artificial neural network on a first training database;
   acquiring at least one image of the aeronautical part;

detecting faults on the image of the aeronautical part using the trained artificial neural network;

unsupervised training of an auto-encoder on a second training database comprising a plurality of training images of aeronautical parts without fault, comprising the following sub-steps:

projecting each image of the second training database on a mathematical space of smaller dimension than the dimension of each image of the second training database, so that the set of projections of the images of the second database in the mathematical space follows a predefined probability law;

reconstructing each image of the second training database from the projection of the image of the second training database onto the mathematical space to obtain a reconstructed image;

for each image of the second training database, calculating a plurality of metrics from the projection of the image of the second training database onto the mathematical space or from the corresponding reconstructed image, to obtain a metric value for each metric;

supervised training of a classifier from the metric values obtained;

detecting faults or anomalies in the image of the aeronautical part using the trained auto-encoder and classifier;

when the artificial neural network detects at least one fault on the image of the aeronautical or when the artificial neural network detects no fault on the image of the aeronautical part and the classifier detects at least one fault or anomaly in the image of the aeronautical part, the aeronautical part is considered non-compliant otherwise, the aeronautical part is considered compliant.

2. The method according to claim 1, wherein the image of the aeronautical part, the plurality of images of the first training database and the plurality of images of the second training database are visible, X-rays, ultrasound or tomography images.

3. The method according to claim 1, further comprising for each metric, distributing the metric values of the images of the second training database into a first group of values and a second group of values according to a predefined validity criterion, the classifier being trained to consider the images of the second training database having the metric values of the first group of values as having no faults or anomalies and the images of the second training database having the metric values of the second group of values as images to be rejected.

4. The method according to claim 1, wherein detecting a fault on the image of the aeronautical part using the trained auto-encoder and classifier comprises the following sub-steps:

projecting, by the auto-encoder, of the image of the aeronautical part onto the mathematical space;

reconstructing, by the auto-encoder, of the image of the aeronautical part from the projection of the image of the aeronautical part onto the mathematical space to obtain a reconstructed image of the aeronautical part calculating metrics from the projection of the image of the aeronautical part onto the mathematical space or from the reconstructed image of the aeronautical part to obtain metric values;

detecting faults on the image of the aeronautical part by the classifier from the metric values obtained for the image of the aeronautical part.

5. The method according to claim 1, wherein the auto-encoder is of variational type or adversarial-auto-encoder type.

6. The method according to claim 1, wherein the plurality of metrics comprises, for a given image, a distance between the projection of the image on the mathematical space and the set of the projections of the plurality of images of the second database in the mathematical space, and/or a distance between the image and the reconstructed image, and/or an entropy of the gaps between the image and the reconstructed image.

7. The method according to claim 6, wherein a law of probability is a multivariate Gaussian law and the distance between the projection of the image onto the mathematical space and the set of the projections of the plurality of images of the second database onto the mathematical space is the Mahalanobis distance.

8. The method according to claim 1, further comprising generating an alert when the artificial neural network detects no fault on the image of the aeronautical part and the classifier detects at least one fault or anomaly in the image of the aeronautical part.

9. A non-transitory computer readable instructions comprising program code instructions for the execution of the steps of the method according to claim 1 when said program code instructions are executed on a computer.

10. The method according to claim 1, wherein the training of the artificial neural network is a supervised training and the first training database comprises a plurality of training images of aeronautical parts with or without fault.

11. The method according to claim 1, wherein the training of the artificial neural network is an unsupervised training and the first training database comprises a plurality of training images of aeronautical parts without fault.

* * * * *